United States Patent
Roselle et al.

(10) Patent No.: US 6,773,737 B1
(45) Date of Patent: Aug. 10, 2004

(54) MICROORGANISM REDUCTION METHODS AND COMPOSITIONS FOR FOOD

(75) Inventors: Brian Joseph Roselle, Fairfield, OH (US); Thomas Edward Ward, Oregonia, OH (US); David Kent Rollins, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/831,778

(22) PCT Filed: Nov. 12, 1999

(86) PCT No.: PCT/US99/26886

§ 371 (c)(1), (2), (4) Date: May 14, 2001

(87) PCT Pub. No.: WO00/30460

PCT Pub. Date: Jun. 2, 2000

Related U.S. Application Data

(60) Provisional application No. 60/109,058, filed on Nov. 19, 1998.

(51) Int. Cl.[7] .............................. A23B 7/154; A23B 4/20; A23L 3/3463
(52) U.S. Cl. ...................... 426/335; 426/615; 426/654
(58) Field of Search .................................. 426/335, 615, 426/654

(56) References Cited

U.S. PATENT DOCUMENTS

| | | | | |
|---|---|---|---|---|
| 4,808,330 A | * | 2/1989 | Chung | 426/335 |
| 5,507,968 A | * | 4/1996 | Palaikis | 252/90 |
| 5,549,758 A | | 8/1996 | Murch et al. | |

FOREIGN PATENT DOCUMENTS

| | | |
|---|---|---|
| WO | WO 95/12326 A1 | 5/1995 |
| WO | WO 97/01288 A1 | 1/1997 |
| WO | WO 97/01623 A1 | 1/1997 |
| WO | WO 97/15202 A1 | 5/1997 |
| WO | WO 98/18352 A1 | 5/1998 |
| WO | WO 99/00025 A1 | 1/1999 |

* cited by examiner

*Primary Examiner*—Helen Pratt
(74) *Attorney, Agent, or Firm*—Jeffrey V. Bamber; Jason J. Camp; Kim William Zerby

(57) ABSTRACT

Basic cleaning compositions using toxicologically-acceptable ingredients for treating food such as produce, e.g., fruits and vegetables, and edible animal proteins are provided. Liquid formulations comprising anionic and/or nonionic detergent surfactant, such as potassium alkyl sulfate, that does not affect palatability, electrolyte to provide at least about 0.04 molarity of cations and basic buffer to provide a pH of at least 8.5 are applied to food products immediately before consumption and can significantly reduce microorganism contamination in less than about one minute. The food can be consumed without rinsing.

2 Claims, No Drawings

MICROORGANISM REDUCTION METHODS AND COMPOSITIONS FOR FOOD

This application claims the benefit of Provisional Application No. 60/109,058 filed Nov. 19, 1998.

TECHNICAL FIELD

The present invention relates to methods for reduction in microorganisms, especially for the purpose of making food, more especially produce, safe for human consumption, and to compositions, especially in concentrated, or the corresponding diluted liquid form, which are especially suitable for practicing said methods.

BACKGROUND OF THE INVENTION

Fruits and vegetables, food preparation surfaces, and sometimes other food products such as meats, are desirably washed prior to ingestion in order to remove soils and other unwanted residues which may be undesirably clinging to the surfaces thereof It is also desirable to reduce microorganisms, thus ensuring safety.

It is especially desirable to provide effective, toxicologically-acceptable compositions for food, including fruits and vegetables and/or meats that can be sold in concentrated form and used to create dilute low-sudsing liquid solutions which can be used to effect antimicrobial action and which desirably provide palatable food without removal. Dilute liquid solutions are convenient for the user, since they can be applied directly to soiled fruits and vegetables, or by simple immersion, thus ensuring that all parts of the food are treated. Clarity of the dilute liquids connotes cleanliness to the user and is thus highly desirable. Low sudsing is an important attribute so that the elimination of any suds is achieved quickly and easily. It is also of advantage if such concentrates can be diluted by the consumer using water that is not safe for use, since that is sometimes the only water that is available.

SUMMARY OF THE INVENTION

The present invention encompasses compositions and methods for treating food, including produce, especially fruits and vegetables, (and compositions, as disclosed hereinafter, for practicing said methods) at a basic pH, even without rinsing, to effect microorganism reduction in a short time period, especially while maintaining palatability. In its broadest aspect, it comprises a method for treating food to reduce the level of microorganisms, said treatment occurring just prior to consumption, comprising the step of contacting the surface of said food with an aqueous treatment composition comprising: anionic and/or nonionic detergent surfactant at a level of at least about 0.015%; basic buffer to provide a pH of greater than about 8.5; and an electrolyte concentration providing at least about 0.04 molarity of cations, for a period of time up to about one minute, the composition preferably being essentially free of any material that adversely affects palatability so that said food does not need to be rinsed before consumption.

The present invention comprises several more specific aspects including:

1. A method for making food, including produce and/or meat, safe to eat comprising contacting the surfaces of said food, shortly before ingestion so as to minimize the chances for recontamination, by direct application of a dilute aqueous treatment composition having a pH above about 8.5, typically comprising:

(a) at least about 0.015%, preferably less than about 5%, more preferably less than about 2%, and even more preferably less than about 1%, by weight of anionic and/or nonionic detergent surfactant, preferably $C_{6-18}$ alkyl sulfate, sulfonate, and/or soap, more preferably about $C_{12}$ alkyl, and preferably sufficient to reduce the surface tension and to maintain the viscosity to less than about 50 cp., preferably to less than about 10 cp., and more preferably to less than about 5 cp., to help maximize surface wetting and/or drainage thus minimizing residue, but preferably less than an amount that will affect palatability, of toxicologically-acceptable detergent surfactant;

(b) toxicologically-acceptable basic buffer, preferably water soluble borates, hydroxides, ortho-phosphates, carbonates, and/or bicarbonates, to provide a pH of from about 8.5 to about 13, preferably from about 10 to about 12.5, more preferably from about 10.5 to about 12.3, but preferably with low reserve alkalinity ("reserve alkalinity" as used herein is equal to the percent of HC1 equivalent needed to lower the pH of the dilute treatment composition to 9.5), that is typically less than about 10, preferably less than about 7, and even more preferably less than about 4, so as to maximize safety, and the level of ortho-phosphate, when present, being from about 0.01% to about 3%, preferably from about 0.05% to about 1%, more preferably from about 0.1% to about 0.5% of ortho-phosphoric acid equivalent;

(c) sufficient electrolyte to provide at least about 0.04 molarity of cations, preferably at least about 0.08, and more preferably at least about 0.12;

(d) optionally, from about 0.0005% to about 3%, preferably from about 0.001% to about 1%, and more preferably from about 0.003% to about 0.5%, by weight of calcium ion sequestrant, preferably polyphosphate detergent builder such as the sodium salt of tripolyphosphate (referred to hereinafter as "STPP") or, a salt of an organic polycarboxylic acid, such as the sodium salt of ethylenediaminetetraacetic acid (referred to hereinafter as "EDTA".) and/or a salt of citric acid to sequester calcium in hard water to control calcium precipitates;

(e) optionally, toxicologically-acceptable preservative;

(f) optionally, toxicologically-acceptable suds suppressor; and (g) the balance comprising an aqueous carrier selected from water and, optionally, low levels of low molecular weight, toxicologically-acceptable organic solvent such as ethanol, glycerol, etc. and/or minor ingredients;

all of the acidic materials above being, of course, neutralized under the alkaline conditions of the product, and said composition being essentially free of any material that is not toxicologically acceptable, said treatment being able to effect at least a one log reduction of *E-coli* in less than about 1 minute, optionally followed by draining and/or drying, even without rinsing, said food being then ready for consumption and having desirable palatability. For the purposes of this invention any anionic surfactant and its counter ion are not included in the determination of the salt level.

The inventions disclosed herein encompass concentrated compositions suitable for use in preparing such dilute compositions for treating food at a basic pH above about 8.5, by diluting with water using from about 0.1% to about 5%, preferably from about 0.5% to about 2%, of the concentrated composition, by weight of the dilute composition, said concentrated composition comprising:

(a) from about 0.1% to about 50%, preferably from about 0.5% to about 20%, and more preferably from about 1% to about 10%, by weight of toxicologically-acceptable anionic and/or nonionic detergent surfactant, preferably base-stable anionic surfactant, and more preferably, a $C_{6-18}$ alkyl sulfate and/or $C_{8-14}$ soap;

(b) toxicologically-acceptable basic buffer, preferably potassium and/or sodium and/or calcium hydroxide, orthophosphate, carbonate, and/or bicarbonate, to provide a pH of from about 8.5 to about 13, preferably from about 10 to about 12.5, more preferably from about 10.5 to about 12.3, in said dilute composition, but with low reserve alkalinity in said dilute composition, preferably less than about 10, more preferably less than about 7 and even more preferably less than about 4, to avoid damage to a human, the level of orthophosphate, when present, being from about 3% to about 60%, preferably from about 5% to about 60%, more preferably from about 10% to about 55%, by weight of ortho-phosphoric acid equivalent;

(c) sufficient electrolyte to provide at least about 0.04 molarity of cations once diluted for use, preferably at least about 0.08, and more preferably at least about 0.12;

(d) optionally, from about 0.1 to about 35%, preferably from about 1 to about 25%, more preferably from about 2 to about 20%, of toxicologically-acceptable calcium ion sequestrant, preferably polyphosphate or organic polycarboxylate, more preferably STPP or EDTA, or combinations of the two, to control calcium ions;

(d) optionally, toxicologically-acceptable preservative;

(e) optionally, toxicologically-acceptable suds suppresser; and (f) the balance comprising compatible, toxicologically-acceptable inert and/or minor ingredients.

In all of the above lists of components, if an ingredient can be classified in more than one place, it will be classified in the first place it can appear. Preferably all ingredients are food grade, since they may be ingested.

A more specific method for preparing food, especially produce such as fruits and vegetables involves exposing the food to a dilute aqueous solution having a basic pH of more than about 8.5 as described above, for a period of time of up to about one minute, said aqueous cleaning solution comprising potassium cations and/or sodium cations. These cations are desirable in the diet for many reasons. Therefore, their presence in a composition for use in treating food materials like vegetables and fruits without rinsing is desirable. Also, the potassium cation is more useful than the sodium cation for soaps, since the potassium soaps are quite soluble as compared to the sodium soaps, especially at low temperatures.

An alkaline method for treating food can comprise contacting the surfaces of produce with an aqueous solution prepared by creating a solution having a pH of from about 8.5 to about 13, preferably from about 10 to about 12.5, more preferably from about 10.5 to about 12.3, using the concentrated composition above and impure water, to provide pure solutions that kill microorganisms on the surface of food. It is important to reduce the level of microorganisms on the surface of food.

Another preferred variation in the above methods for treating food such as produce involves placing concentrated compositions, as disclosed herein, into containers in association with instructions to use the composition to form said dilute solutions to treat food. Such instructions are very important, since the amount of dilution, the time of treatment, special instructions regarding rinsing, and the ability to use impure water to form the treatment solution are not intuitive. It is also important that the instructions be as simple and clear as possible, so that using pictures and/or icons is desirable.

The balance of the composition can comprise various optional adjunct materials, pH-adjusting agents, perfumes or essences, preservatives, suds suppressors, and the like.

The ingredients in the above concentrated compositions are preferably "food grade" and selected and used in proportions which provide substantially clear dilute compositions. "Substantially clear" includes only minimal haziness, and preferably the compositions are completely clear. The ingredients are also selected to have minimal odor, both initially and after storage. The lack of objectionable odor is especially important in compositions for use on food.

In order to mask any objectionable odor, the compositions can contain a food grade or GRAS (defined hereinafter) perfume, or essence, ingredient. Especially preferred for this use are oils derived from citrus fruit, e.g., oranges, lemons, limes, grapefruits, tangerines, tangelos, etc. which contain relatively large amounts of terpenes.

Preferred compositions for use herein contain only materials that are food grade or GRAS, including, of course, direct food additives affirmed as GRAS, to protect against possible misuse by the consumer. Traditionally, most suggestions for cleaning of fruits and/or vegetables have contemplated a commercial scale where there is typically more control over the conditions, especially the amount and thoroughness of rinsing. The present invention includes use by individual consumers without rinsing, so that it is essential that extra safety be built into the product. Failure to rinse thoroughly after cleaning is less of a concern if all of the ingredients are GRAS and/or food grade.

The use and selection of cleaning ingredients for the purpose of washing fruits and vegetables is described by the United States Code of Federal Regulations, Title 21, Section 173.315: "Ingredients for use in washing or lye peeling of fruits and vegetables". These regulations restrict the ingredients that may be used for direct contact with food to those described as "generally recognized as safe" (GRAS), and a few other selected ingredients. These sections also provide certain limitations on the amount of material that can be used in a given context. However, there are no regulations, or suggestions, for methods of making food safe for consumption using aqueous compositions that do not need to be removed. Also, there is no known method for killing microbes using materials like hypochlorite, iodine, etc. at low levels that provide desirable palatability.

All documents cited herein are incorporated herein by reference.

DETAILED DESCRIPTION OF THE INVENTION

The following toxicologically-acceptable ingredients are used in the preparation of the preferred compositions herein. By "toxicologically-acceptable" is meant that any residues from the ingredients of the compositions which may remain on the fruits or vegetables cleansed therewith are safe for ingestion by humans and/or lower animals.

Detergent Surfactant

Synthetic Anionic Surfactant—Base stable anionic surfactants can be employed, e.g., as allowed in the United States by the United States Code of Federal Regulations (CFR), Title 21, Section 173.315. Specific mention is made of salts of dodecylbenzene sulfonate, typically at levels up to 0.2%. Also described in the CFR are phosphate esters of ethylene and,or ethylene/propylene oxide adducts of aliphatic alcohols, dioctyl sulfosuccinate, and 2-ethylhexyl sulfate.

The anionic surfactant is preferably selected from materials known in the art, such as $C_{6-18}$ alkyl sulfates and/or sulfonates; $C_{6-15}$ alkylbenzene sulfonates; di-$C_{6-10}$ alkyl sulfosuccinates, etc. The alkyl sulfates are preferred, for antimicrobial effectiveness and palatability, especially as the sodium salts. Potassium $C_{8-14}$ soaps are also preferred. Mixtures of such alkyl sulfates and soaps are also preferred.

Nonionic Surfactant—Nonionic surfactants, when used, are preferably selected from materials known in the art, such as alkylene oxide (ethylene oxide and/or propylene oxide) adducts of $C_{10-18}$ aliphatic alcohols or acids, polysorbates, $C_{10-18}$ aliphatic alcohol adducts of glucose (alkyl polyglucosides). The specific nonionic surfactant selected ideally has a hydrophilic-lipophilic balance (HLB) greater than about 10, and a cloud point above about 35° C. in the composition. The United States Code of Federal Regulations (CFR) specifically describes an ethylene oxide/propylene oxide adduct of C12–18 aliphatic alcohol of molecular weight of about 800. Such a material is available as PLURAFAC RA-20 (BASF).

In compositions containing soap, the alkoxylated alcohol functions mainly as a dispersant for any soap curd which may form during the cleansing operation. Further, it is recognized that the selection of non-nitrogen containing nonionics can minimize the possibility of microbial growth in the dilute surfactant compositions.

Fatty Salts—The compositions herein can contain soap, especially a $C_{8-14}$ soap like coconut fatty acid middle cut soap. Lauric acid is convenient for this use. Specific solubilizing surfactants in higher proportions can be used to solubilize these soaps. However, soaps should not be used in large quantities because of taste considerations.

The presence of the detergent surfactant is important for microorganism reduction, especially at a pH of less than about 10. The detergent surfactant also is used for reduction of the surface tension and controlling viscosity. It is highly desirable that the dilute treatment compositions have a low viscosity, typically less than about 50, preferably less than about 10, and more preferably less than about 5. The low viscosity improves the completeness of the treatment by promoting spreading over the surface of the food, especially where there are layers, rugosities, etc. The low viscosity also improves drainage, thus providing at least some soil removal. Low viscosity also improves speed of drying, if that is desired. Thus, the detergent surfactant provides highly important advantages in terms of treatment.

In combination with salt, the detergent surfactant improves antimicrobial action. The presence of the surfactant, and especially the alkyl sulfate, provides improved kill and/or rate of kill, especially for short times and/or lower pH.

It is important that the detergent surfactant not affect palatability. Accordingly, the level should be low. As discussed before, soap is not usually used in large amounts because of taste considerations and food grade surfactants are highly desirable for taste considerations.

Alkaline Buffer

Toxicologically-acceptable basic buffers are used in the compositions herein to maintain product pH in the desired range. For ease of formulatability, it is often desirable that such basic buffers be in their potassium salt form, especially in liquid concentrates that utilize neutralized fatty acid surfactants. Sodium salts are acceptable, and even preferred, in solid, e.g., powder formulas or in conjunction with alkyl sulfate/sulfonate surfactants. Potassium/sodium carbonate and/or potassium/sodium ortho-phosphate are convenient and preferred basic pH buffers. Calcium and/or magnesium hydroxides can also be used to create a basic pH, especially if the composition does not contain calcium ion sequestrant. Sodium and potassium hydroxides can be used as part of alkaline buffer systems. The levels and identities of the ingredients are adjusted to provide dilute products having the desired viscosities as set forth herein, e.g., less than about 50, preferably less than about 10, more preferably less than about 5 centipoise under shear of $\geq$~1000 sec$^{-1}$.

The pH is preferably not greater than about 13, and especially does not contain large amounts of buffer at higher pHs for consumer safety, especially when the compositions are not fully removed. Reserve alkalinity should be from about 0.1 to about 10, preferably from about 0.2 to about 7, and more preferably from about 0.3 to about 4.

The pH buffer is also part of the electrolyte, discussed hereinafter.

Electrolyte

In combination with the surfactant, a sufficiently high electrolyte concentration is essential for effective microorganism reduction in short times and/or at a low pH. Suitable electrolytes include: calcium disodium ethylenediaminetetraacetate (EDTA), disodium EDTA, potassium nitrate, sodium nitrate, sodium nitrite, stannous chloride, aluminum nicotinate, calcium pantothenate, calcium chloride double salt, potassium iodide, zinc methionine sulfate, calcium silicate, iron ammonium citrate, disodium guanylate, disodium inosinate, salts of carrageenan, salts of furcelleran, calcium lignosulfonate, calcium lactobionate, gibberellic acid and its potassium salt, potassium bromate, dioctyl sodium sulfosuccinate, sodium acid pyrophosphate, aluminum sulfate, aluminum ammonium sulfate, aluminum potassium sulfate, aluminum sodium sulfate, calcium phosphate, sodium carboxymethylcellulose, sodium caseinate, sodium phosphate, sodium aluminum phosphate, sodium tripolyphosphate, aluminum calcium silicate, calcium silicate, magnesium silicate, sodium aluminosilicate, sodium calcium aluminosilicate, hydrated tricalcium silicate, calcium ascorbate, calcium sorbate, potassium bisulfite, potassium metabisulfite, potassium sorbate, sodium ascorbate, sodium bisulfite, sodium metabisulfite, sodium sorbate, sodium sulfite, sodium acid phosphate, calcium diacetate, calcium hexametaphosphate, monobasic calcium phosphate, dipotassium phosphate, disodium phosphate, sodium hexanetaphosphate, sodium metaphosphate, sodium phosphate, sodium pyrophosphate, tetra sodium pyrophosphate, sodium tripolyphosphate, calcium phosphate, calcium pyrophosphate, sodium phosphate, zinc chloride, zinc gluconate, zinc oxide, zinc stearate, zinc sulfate, potassium acid tartrate, ammonium bicarbonate, ammonium carbonate, ammonium chloride, ammonium hydroxide, ammonium citrate, dibasic ammonium phosphate, monobasic ammonium phosphate, dibasic ammonium sulfate, calcium acetate, calcium alginate, calcium carbonate, calcium chloride, calcium citrate, calcium gluconate, calcium glycerophosphate, calcium hydroxide, calcium iodate, calcium lactate, calcium oxide, calcium pantothenate, calcium propionate, calcium stearate, calcium sulfate, copper gluconate, copper sulfate, ferric ammonium citrate, ferric chloride, ferric citrate, ferric phosphate, ferric pyrophosphate, ferric sulfate, ferrous ascorbate, ferrous carbonate, ferrous citrate, ferrous fumarate, ferrous gluconate, ferrous lactate, ferrous sulfate, iron, elemental, magnesium carbonate, magnesium chloride, magnesium citrate dibasic, magnesium hydroxide, magnesium oxide, magnesium phosphate, magnesium sulfate, manganese chloride, manganese citrate, manganese gluconate, manganese sulfate, monosodium phosphate derivatives of mono- and diglycerides, nickel, potassium alginate, potassium bicarbonate, potassium carbonate, potassium chloride, potassium citrate, potassium hydroxide, potassium iodide, potassium iodate, potassium lactate, potassium sulfate, sodium acetate, sodium alginate, sodium benzoate, sodium bicarbonate, sodium carbonate, sodium chloride, sodium citrate, sodium diacetate, sodium hydroxide, sodium hypophosphite, sodium lactate, sodium metasilicate, sodium propionate, sodium sesquicarbonate, sodium tartrate, sodium potassium tartrate, sodium thiosulfate, stannous chloride (anhydrous and dihydrated).

It will be recognized that the above electrolyte salts should preferably be used in mounts that are non-toxic and which do not cause unacceptable taste and/or feel in the mouth when the salts are not removed. The molarity of cations is preferably at least 0.04, more preferably at least about 0.08, and even more preferably at least about 0.12.

Sequestrant/Builder

The preferred sequestrant and/or builder herein is polyphosphate salt or organic polycarboxylic salt, e.g., sodium and/or potassium citrate, and/or sodium and/or potassium ethylenediaminetetraacetate, which are standard items of commerce and are GRAS. Other organic polycarboxylic acids, especially those that are GRAS, such as citric, tartaric, malic, etc. acids, can also be used. A preferred version of polyphosphate is an anhydrous Fast Dissolving STPP manufactured by the FMC corporation. Complex phosphates can also be used, and are highly useful to maintain the clarity of dilute solutions made from hard water, but are generally avoided due to regulatory considerations where phosphate levels are specifically forbidden or highly restricted. Typically, the sequestrant/builder is present at a level of from about 0.0005% to about 3%, preferably from about 0.001% to about 0.5%, and more preferably from about 0.003% to about 0.2%, by weight of the dilute composition. Sequestrant/builders can maintain the efficacy of the formulas in the presence of hardness. Sequestrant/builders are a special case of the electrolyte and are considered in the computation of the electrolyte molarity.

Preservative

Formulating the present concentrated compositions with essential surfactant and electrolyte reduces the tendency for biological growth of contaminants, such as bacteria, fungi, or molds. However, preservatives can help insure the lack of biological growth through contamination in making or in use. Standard food-grade preservatives such as ethylenediaminetetraacetic acid and/or the salts thereof, at a level of from about 0.001% to about 0.2% of ethylenediaminetetraacetic acid, or its sodium and/or potassium salts, can be used although, in general, the compositions herein do not require a preservative.

Fluid Carrier

The major proportion, e.g., more than about two thirds, (typically, approximately 80%–99.7%, by weight) of the dilute compositions herein comprises water as the solubilizing carrier for the ingredients. As noted in the Examples hereinafter, water- ethanol can also be employed and is especially preferred when formulating the basic pH compositions herein. The ethanol level in the dilute composition preferably should not exceed 10% in the solution used to treat the produce, to avoid an alcoholic odor. Other compatible, water-soluble, low molecular weight solvents such as glycerol can also be used. Glycerol can also be used in solid compositions to minimize fines. It is an advantage of this invention, that one can use impure water to prepare the dilute composition, the microorganisms being killed by the high pH and/or surfactant and/or builder and/or electrolyte. As used herein, "impure water" is water that is impure by reason of microorganisms being present.

Optional Ingredients

Polyethylene Glycol—The water-soluble polyethylene glycol polymer (PEG) employed which can be employed herein is the known article of commerce and is available under a variety of trade names, of which CARBOWAX (Union Carbide Corporation) is exemplary. PEG's in the average molecular weight range of from about 200 to about 20,000 can be used herein, and PEG as CARBOWAX in the average molecular weight range of at least about 200, typically 300 to about 9500, is convenient and preferred. The dilute compositions herein can comprise at least about 0.001%, by weight, of the PEG and will typically comprise from about 0.005% to about 0.1%, by weight, of PEG. The amounts used can vary with the molecular weight of the PEG, the amount of surfactant used in the composition, the desired viscosity of the composition, and like factors within the discretion of the formulator. In a typical mode, the preferred compositions herein that have an improved tactile impression will comprise surfactant/PEG weight ratios in the range from about 1:2 to about 30:1, preferably from about 1:1 to about 15:1.

The compositions herein which contain the polyethylene glycol are characterized not only by their excellent cleaning performance and sudsing/rinsability properties, but also by their improved "feel". The improved feel of the compositions which come into contact with the users' hands is a qualitative tactile impression. However, this improved, "non-slippery", "non-soapy" improvement in skin feel can be demonstrated by rubbing Test (PEG-containing) and Control (no PEG) compositions on the hands or inner forearms of volunteer graders. Even in such rudimentary tests, the graders can readily distinguish the improved tactile impression of the compositions.

Antioxidants The use of surfactants, and especially soaps, can be complicated by development of off-odors and/or yellowing of the compositions in which they appear. These undesirable properties are believed to be caused by complex side reactions initiated by the reaction of oxygen with primarily the polyunsaturated components of the fatty acid stock. These results can be avoided, or minimized, by avoiding contact with air, or by controlling the quality of the fatty acid stock so that the amount and type of polyunsaturates are minimized as described above, and/or by the addition of chelants and/or antioxidants.

It has been found, that the addition of tocopherols (e.g., Vitamin E, or tocopherol acetates) in alkaline formulations is advantageous, as they do not degrade, nor do they impart a strong color. They inhibit the development of off-odors for extended periods of time so that the need for masking scents is minimized, or eliminated, particularly for oleic acid stocks of high quality, as described above. The use of butylated phenols, such as BHT and BHA is also useful, but their effectiveness appears more limited and they can impart stronger colors to the compositions. Other food grade antioxidants such as Vitamin C, sorbates, and sulfites, are desirable to prevent deterioration of the compositions by the action of oxygen, but care must be taken since vitamin C can suffer color degradation and sulfites can cause odor problems. Sulfites also have been the target of potential health concerns.

Suds suppressors. (Silicones and their derivatives) At low levels, suds suppressors or antifoamers can be used, especially in the case where a certain surfactant level is desired for wetting and/or efficacy, but the degree of foam generated in the washing of produce is desired to be kept low. The amount of suds suppresser can be tailored in conjunction with the type and level of surfactant used. DC-4270 and DC2-4242 from Dow Corning are useful suds suppressors.

The PEG, previously discussed, can alternately be used as a carrier or binder material for a silicone suds suppresser particle in dry powder concentrate formulas. Typically the PEG molecular weights are such that the PEG is a solid at room temperature to contain the silicone. A preferred M. W. in this case is 8000.

In the case where PEG is an integral part of the carrier for silicone in a power concentrate, caution should be used in the processing of the material to avoid excessive shearing of the dry product. PEG can be soft enough that excessive shear could alter the integrity of the particle formed with it.

Mild fragrances. Odor ingredients can be useful at low levels in concentrates. They can give a concentrate a favorable odor, but under dilution are not noticeable in solution or on treated items.

Conventional halogen antimicrobials. One of the advantages of the present invention is that it makes it unnecessary to use hypochlorite, or iodine, as a means of reducing microorganism populations. Such materials are known to have undesirable tastes, and can add to environmental pollution However, it is sometimes desirable to have a small amount of hypochlorite salt, typically lithium, sodium, potassium, calcium, and/or magnesium, and/or a source of iodine, present at a low level for additional kill of microorganisms.

Usage

The concentrated compositions herein are preferably used by placing them in a container, such as a pan, with water, preferably pure, to form the dilute compositions and facilitate immersion of the food, or by dilution and then application to the surface to be treated.

A typical use involves treating individual items of food in a "bath" followed by draining the food and/or drying, to minimize the amount of composition left on the food.

In an optional process for using the dilute compositions described herein, the food product is rinsed, cleaned, rubbed, and/or wiped off with a suitable clean material like cloth, sponge, a paper towel, etc. In another optional process, potentially impure water is treated with the concentrated composition to kill microorganisms and this "treated" water is used to rinse food that has been treated with the dilute treatment composition in another vessel. This protects against the undetected gradual contamination of the original treatment composition. The "rinse" composition can contain lower levels of the concentrate, since all that is needed is to kill the microorganisms in the water itself.

Surprisingly, the compositions and processes described herein can provide effective disinfectancy/sanitization. In order to provide good kill of microorganisms, especially bacteria, one should use high concentrations and/or longer exposure times. Typically, the dilute compositions should be used full strength and allowed to remain on the food for up to about one half minute, preferably up to about one minute. Longer exposure times (i.e., the time that the bacteria are in contact with the product) are not required to observe antimicrobial benefits.

Higher pHs are also better, in general.

The methods herein can comprise forming the dilute treatment composition using either (a) pure and/or (b) impure water and after application by immersion and/or spray, then either (1) not rinsing so that any removal is by mechanical means, absorption, and/or draining; (2) rinsing with pure water if it is available; and/or (3) treating impure water with the dilute treatment composition to create "pure" rinse water and then rinsing.

Food

All kinds of foods can be treated. Examples include: produce including fruits and vegetables such as apples, grapes, peaches, potatoes, lettuce, tomatoes, celery, and the like, that are to be eaten after treatment, and edible animal protein, especially meat, seafood and poultry, including foodstuffs which are comprised essentially of the protein found in such foods sources including, but not limited to, beef, pork, chicken, turkey, fish, shellfish and game meats such as venison, rabbit and the like. Said edible animal protein includes the processed forms of said protein sources, including, but not limited to, such forms as ground beef, ground turkey, bologna, hot dogs, sausages, fish cakes, and the like. The food is preferably ready to eat after treatment, and is eaten shortly thereafter to minimize recontamination.

The compositions can also be used for cleaning (especially spot removal), disinfectancy, or sanitization, on non-food (i.e., any surface which is not used as food, even those which are not in contact with food), inanimate, household surfaces, especially those used in food production and other food-contacting surfaces (surfaces that come in contact with food). E.g., cutting boards, counter tops, utensils, dishes, colanders, sinks, sponges, towels, dish cloths, cloth napkins (serviettes), table cloths, and other surfaces that come in contact with food. It is desirable to disinfect/sanitize before the surfaces come in contact with the food, and is desirable to redisinfect/sanitize whenever the surfaces become recontaminated. The products herein, containing all GRAS and/or food grade ingredients, are perfect for this purpose. On hard surfaces, of course, the compositions can be removed, after sufficient time has elapsed, by rinsing if pure water is available, or by absorption/wiping with an appropriate object, e.g., paper towel, sponge, squeegee, etc.

The compositions of this invention can also be used to treat/clean other non-food inanimate household surfaces, such as fabrics, e.g., clothing, shoes, and shower curtains, especially those that are used by infants, especially toys, diapers (napkins), and bibs. The contaminated fabrics can be disinfected/sanitized, then allowed to drain and/or dry, while minimizing the risk if the infant puts the fabric or other article in its mouth. However, it is desirable to rinse fabrics, at least with water that contains less alkalinity. The fabric can be treated totally, or by spot treatment, then the composition is preferably removed, at least partially, e.g., by draining, absorbency, and/or mechanical force. The products can also be used to treat animals and humans to disinfect skin, hair, etc. Care should be used to avoid damage if the product has a high pH.

Packaging the products herein in a container with instructions for usage in terms of timing and proper dilution in order to provide disinfectancy/sanitization, will help the individual consumer by providing information for proper usage in order to remove/kill microorganisms. It is a special advantage of the product that it can be used for this purpose at a time in the food production process where recontamination is minimized. The instructions desirably provide assurance that short times are acceptable and/or that rinsing is not needed in order to avoid possible recontamination by rinsing with impure water.

For fabrics, the pH of the compositions is preferably below about 11.5, more preferably below 11.0.

For fabric and hard surfaces, the distribution of the compositions of this invention can be achieved by using a spray device, a roller, a pad, etc., or dipping in a "bath" of said compositions. Spraying is a preferred method.

All parts, percentages, and ratios herein are "by weight" unless otherwise stated. All number values are approximate unless otherwise stated.

The following Examples illustrate the compositions and processes of this invention, but are not intended to be limiting thereof. The exemplified basic liquid dilute treatment compositions can be prepared at pH 8.5–13 by dissolving the concentrated compositions, or the individual ingredients, in water or water-ethanol using conventional mixing apparatus. In a convenient mode, e.g., the concentrate of Example Q, water is placed in a treatment vessel. Sodium lauryl sulfate, trisodium phosphate crystals, and sodium chloride are added in the named sequence, with stirring.

The following examples depict the bacteria kill efficacy of the proposed invention as determined by a standard AOAC germicidal and detergent sanitizing test. Test organisms *E. coli*, ATCC 11229, or *Staphylococcus aureus*, ATCC 6538, are prepared in an inoculum with a 5% organic soil load (horse serum) prepared with French culture bottles to achieve higher cfu/ml. The test exposure temperature is 25° C. and incubation time for survivor count is 48–54 hours at 35° C.

As used herein, total cation molarity does not include any cation from the surfactant.

EXAMPLES

The following solutions (A–F) were prepared and tested for efficacy. Examples where no surfactant, but above our specified salt level, are insufficient.

|  | Comparative Example A Nominal Wt % |  | Comparative Example B Nominal Wt % |
|---|---|---|---|
| NaHCO$_3$ | 2.0 | NaHCO$_3$ | 2.0 |
| NaOH | 0.19 | NaOH | 0.19 |
| Ethanol | 2.0 | Water | balance |
| Water | balance | pH | 10.5 |
| pH | 10.5 |  |  |
| Total cation molarity | 0.289 | Total cation molarity | 0.289 |
| Log reduction E-Coli | 0.29 @ 1 minute | Log reduction E-Coli | 0.23 @ 1 minute |

|  | Comparative Example C Nominal Wt % |
|---|---|
| Sodium Lauryl Sulfate | 0.01 |
| Na$_3$PO$_4$.12H$_2$O | 0.46 |
| Water | balance |
| pH | 10.5 |
| Total cation molarity | 0.036 |
| Log reduction E-Coli | 0.05 @ 1 minute |

|  | Comparative Example D Nominal Wt % |
|---|---|
| Oleic acid | 0.44 |
| NaHCO$_3$ | 2.0 |
| KOH | 1.81 |
| Ethanol | 2.0 |
| Citric acid | 0.52 |
| PEG 3350 | 0.1 |
| Water | balance |
| pH | 10.5 |
| Total cation molarity | 0.359 |
| Log reduction E-Coli | 0.47 @ 1 minute |

|  | Comparative Example E Nominal Wt % |
|---|---|
| Sodium Lauryl Sulfate | 0.2 |
| Na$_3$PO$_4$.12H$_2$O | 0.175 |
| Na$_2$CO$_3$ | — |
| STPP | 0.1 |
| Water | balance |
| pH | ~11.5 |
| Total cation molarity | 0.027 |
| Log reduction E-Coli | 0 @ 1 minute |

|  | Comparative Example F Nominal Wt % |  | Comparative Example G Nominal Wt % |
|---|---|---|---|
| Sodium Lauryl Sulfate | 0.15 | Sodium Lauryl Sulfate | 0.1 |
| Na$_3$PO$_4$.12H$_2$O | 0.225 | Na$_3$PO$_4$.12H$_2$O | 0.275 |
| STPP | 0.1 | STPP | 0.1 |
| Water | balance | Water | balance |
| pH | ~11.5 | pH | ~11.5 |
| Total cation molarity | 0.031 | Total cation molarity | 0.035 |
| Log reduction E-Coli | 0 @ 1 minute | Log reduction E-Coli | 0 @ 1 minute |

|  | Comparative Example H Nominal Wt % |  | Comparative Example I Nominal Wt % |
|---|---|---|---|
| Sodium Lauryl Sulfate | 0.05 | Sodium Lauryl Sulfate | 0.04 |
| Na$_3$PO$_4$.12H$_2$O | 0.325 | Na$_3$PO$_4$.12H$_2$O | 0.335 |
| STPP | 0.1 | STPP | 0.1 |
| Water | balance | Water | balance |
| pH | ~11.5 | pH | ~11.5 |
| Total cation molarity | 0.039 | Total cation molarity | 0.04 |
| Log reduction E-Coli | 0 @ 1 minute | Log reduction E-Coli | 0 @ 1 minute |

Examples A–R show a combination of specific surfactant at the required level, and specified total salt cation molarity, gives surprisingly successful results.

|  | A Nominal Wt % |  | B Nominal Wt % |
|---|---|---|---|
| Sodium Lauryl Sulfate | 0.063 | Sodium Lauryl Sulfate | 0.5 |
| Na$_3$PO$_4$.12H$_2$O | 0.176 | NaOH | 0.05 |
| Na$_2$CO$_3$ | 0.25 | NaHCO$_3$ | 2.0 |
| STPP | — | Water | balance |
| Water | balance | pH | 8.5 |
| pH | ~11.5 |  |  |
| Total cation molarity | 0.062 | Total cation molarity | 0.253 |
| Log reduction E-Coli | 1.5 @ 1 minute | Log reduction E-Coli | 4.5 @ 1 minute |

|  | C Nominal Wt % |  | D Nominal Wt % |
|---|---|---|---|
| Sodium Lauryl Sulfate | 0.05 | Sodium Lauryl Sulfate | 0.5 |
| NaOH | 0.8 | NaOH | 0.1 |
| NaHCO$_3$ | 2.0 | NaHCO$_3$ | 0.25 |
| Na$_2$SO$_4$ | — | Na$_2$SO$_4$ | 3.0 |
| Water | balance | Water | balance |
| pH | 10.5 | pH | 10.5 |
| Total cation molarity | 0.442 | Total cation molarity | 0.482 |
| Log reduction E-Coli | 1.7 @ 0.5 minute 3.3 @ 1 minute | Log reduction E-Coli | 1.5 @ 0.5 minute 4 @ 1 minute |

|  | E Nominal Wt % |  | F Nominal Wt % |
|---|---|---|---|
| Lauric Acid | 1.87 | Sodium Lauryl Sulfate | 0.11 |
| KOH | 2.25 | NaOH | 1.25 |
| KHCO$_3$ | 2.38 | NaHCO$_3$ | 2.0 |
| Ethanol | 2.0 | Ethanol | 3.5 |
| Na$_2$EDTA | 0.003 | Na$_2$EDTA | 0.003 |
| Citric Acid | 0.52 | Citric Acid | 0.52 |
| PEG 3350 | 0.50 | Water | balance |
| Water | balance |  |  |
| pH | 11.5 | pH | 10.8 |
| Total cation molarity | 0.551 | Total cation molarity | 0.557 |
| Log reduction Staph. Aureus | 3.1 @ 0.5 minute 3.4 @ 1 minute | Log reduction Staph. Aureus | 6.7 @ 0.5 minute 6.9 @ 1 minute |

|  | G Nominal Wt % |  | H Nominal Wt % |
|---|---|---|---|
| Lauric Acid | 1.87 | Sodium Lauryl Sulfate | 0.5 |
| KOH | 2.26 | NaOH | 0.62 |
| NaHCO$_3$ | 2.0 | NaHCO$_3$ | 0.55 |
| Ethanol | 7.5 | Ethanol | 2.0 |
| Na$_2$EDTA | 0.003 | Na$_2$EDTA | 0.003 |
| Citric Acid | 0.52 | Na Acetate | 0.10 |
| PEG 3350 | 0.50 | Citric Acid | 0.54 |
| Water | balance | PEG 200 | 0.10 |
| pH | 11.5 | Water | balance |
|  |  | pH | 11.57 |
| Total cation molarity | 0.552 | Total cation molarity | 0.223 |
| Log reduction Staph. Aureus | 2.7 @ 0.5 minute 3.4 @ 1 minute | Log reduction Staph. Aureus | 3.9 @ 0.5 minute 4.1 @ 1 minute |

|  | I Nominal Wt % |  | J Nominal Wt % |
|---|---|---|---|
| Sodium Lauryl Sulfate | 0.02 | Sodium Lauryl Sulfate | 0.02 |
| Na$_3$PO$_4$.12H$_2$O | 0.36 | Na$_3$PO$_4$.12H$_2$O | 0.31 |
| Na$_2$CO$_3$ | 0.05 | Na$_2$CO$_3$ | 0.15 |
| STPP | 0.05 | STPP | — |
| Water | balance | Water | balance |
| pH | ~11.5 | pH | ~11.5 |
| Total cation molarity | 0.045 | Total cation molarity | 0.054 |

-continued

| | | | |
|---|---|---|---|
| Log reduction E-Coli | 5.2 @ 0.5 minute 7 @ 1 minute | Log reduction E-Coli | 1.1 @ 0.5 minute 3.1 @ 1 minute |

| K Nominal Wt % | |
|---|---|
| Sodium Lauryl Sulfate | 0.02 |
| Na$_3$PO$_4$.12H$_2$O | 0.26 |
| Na$_2$CO$_3$ | 0.2 |
| STPP | — |
| Water | balance |
| pH | ~11.5 |
| Total cation molarity | 0.059 |
| Log reduction E-Coli | 1 @ 0.1 minute 2.7 @ 1 minute |

| L Nominal Wt % | | M Nominal Wt % | |
|---|---|---|---|
| Sodium Lauryl Sulfate | 0.125 | Sodium Lauryl Sulfate | 0.125 |
| Na$_3$PO$_4$.12H$_2$O | 0.2 | Na$_3$PO$_4$.12H$_2$O | 0.15 |
| Na$_2$CO$_3$ | 0.15 | Na$_2$CO$_3$ | 0.2 |
| Water | balance | Water | balance |
| pH | ~11.5 | pH | ~11.5 |
| Total cation molarity | 0.044 | Total cation molarity | 0.051 |
| Log reduction E-Coli | 1.4 @ 0.5 minute 1.3 @ 1 minute | Log reduction E-Coli | 1 @ 0.5 minute 1.2 @ 1 minute |

| N Nominal Wt % | | O Nominal Wt % | |
|---|---|---|---|
| Sodium Lauryl Sulfate | 0.075 | Sodium Lauryl Sulfate | 0.1 |
| Na$_3$PO$_4$.12H$_2$O | 0.21 | Na$_3$PO$_4$.12H$_2$O | 0.28 |
| Na$_2$CO$_3$ | 0.3 | Na$_2$CO$_3$ | 0.4 |
| Water | balance | Water | balance |
| pH | ~11.5 | pH | ~11.5 |
| Total cation molarity | 0.074 | Total cation molarity | 0.099 |
| Log reduction E-Coli | 3.2 @ 0.5 minute 3.8 @ 1 minute | Log reduction E-Coli | 5 @ 0.5 minute 3.7 @ 1 minute |

| P Nominal Wt % | | Q Nominal Wt % | |
|---|---|---|---|
| Sodium Lauryl Sulfate | 0.016 | Sodium Lauryl Sulfate | 0.125 |
| Na$_3$PO$_4$.12H$_2$O | 0.285 | Na$_3$PO$_4$.12H$_2$O | 0.33 |
| NaCl | 0.2 | NaCl | 0.5 |
| STPP | 0.08 | STPP | — |
| Water | balance | Water | balance |
| pH | ~11.5 | pH | ~11.5 |
| Total cation molarity | 0.069 | Total cation molarity | 0.112 |
| Log reduction E-Coli | 7 @ 1 minute | Log reduction E-Coli | 7 @ 1 minute |

| R Nominal Wt % | |
|---|---|
| Sodium Lauryl Sulfate | 0.2 |
| Oleic acid | 0.05 |
| NaHCO$_3$ | 2.0 |
| NaOH | 1.3 |
| Ethanol | 4.5 |
| Na$_2$ EDTA.2H$_2$O | 0.003 |
| Citric acid | 0.54 |
| Grapefruit oil | 0.05 |
| Water | balance |
| pH | ~11.5 |
| Total cation molarity | 0.569 |

-continued

| | |
|---|---|
| Log reduction E-Coli | >5@0.5minute |

STPP is sodium tripolyphosphate and PEG is polyethylene glycol with the indicated molecular weight.

A pleasant citrus odor in solution can also be obtained by using citrus extracts such as Lime 63 or distilled Grapefruit oil which are food grade flavorants/perfumes.

Produce washed in the soak solutions are determined to have no negative effects on it in regards to taste or palatability even without a rinse.

What is claimed is:

1. A method for treating food to clean and reduce the level of microorganisms on the surface of said food, said method comprising treatment occurring just prior to consumption, comprising the step of contacting the surface of said food with a aqueous dilute treatment composition comprising a toxicologically-acceptable anionic detergent surfactant; total electrolyte to provide at least about 0.04 molarity of cations, and toxicologically-acceptable basic buffer to provide a pH of greater than about 8.5, the composition being essentially free of any material that adversely affects safety or palatability, so that said food does not need to be rinsed before consumption, said composition comprising:

(a) greater than about 0.015% by weight of a member selected from the group consisting of sodium or potassium lauryl sulfate, and mixtures thereof;

(b) toxicologically-acceptable basic buffer selected from the group consisting of water soluble borates, hydroxides, ortho-phosphates, carbonates, and/or bicarbonates, to provide a pH of from about 8.5 to about 13

(c) sufficient electrolyte to provide at least about 0.04 molarity of cations without considering any surfactant cations:

(d) optionally, from about 0.0005% to about 3% by weight of calcium ion sequestrant selected from the group consisting of water soluble salts of polyphosphates, organic polycarboxylic acid, and mixtures thereof;

(e) optionally, toxicologically-acceptable preservative;

(f) optionally, toxicologically acceptable suds suppressor;

(g) the balance comprising an aqueous carrier optionally containing ethanol.

2. The method of claim 1 wherein said aqueous treatment composition comprises:

(a) less than about 5% by weight and sufficient to maintain the viscosity of said solution to less than about 50 centipoise, of sodium or potassium lauryl sulfate;

(b) toxically-acceptable basic buffer selected from the group consisting of water soluble potassium and/or sodium, hydroxides, ortho-phosphates, and/or carbonates, to provide a pH of from about 10.0 to about 12.5;

(c) sufficient electrolyte to provide at least about 0.08 molarity of cations and (d) from about 0.001% to about 2% by weight of said calcium ion sequestrant, which is selected from the group consisting of sodium and/or potassium tripolyphosphate, ethylenediaminetetraacetate, citrate, and mixtures thereof.

* * * * *